Patented May 14, 1929.

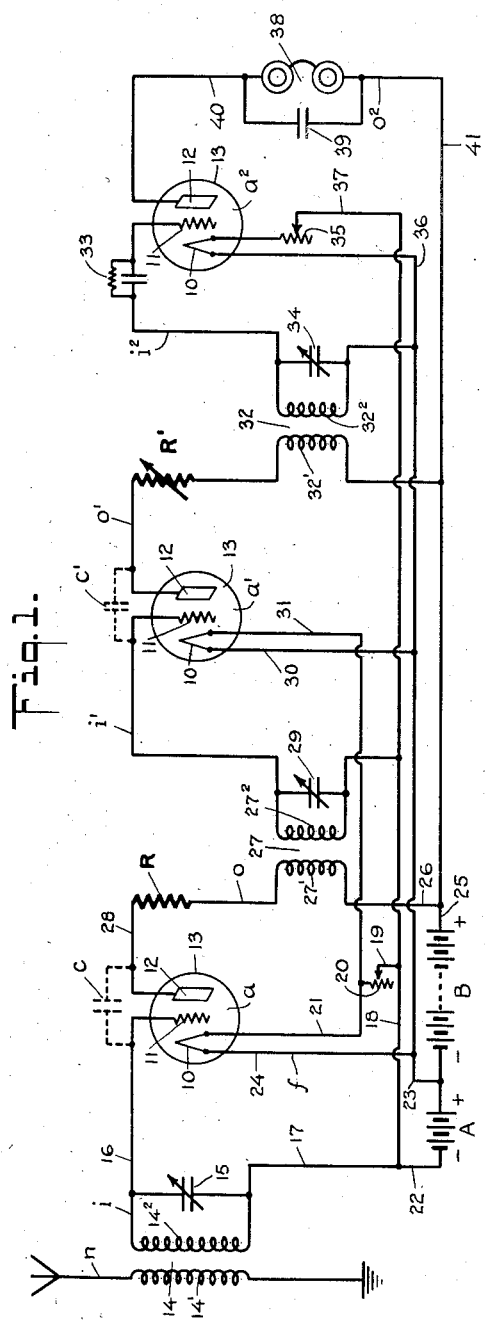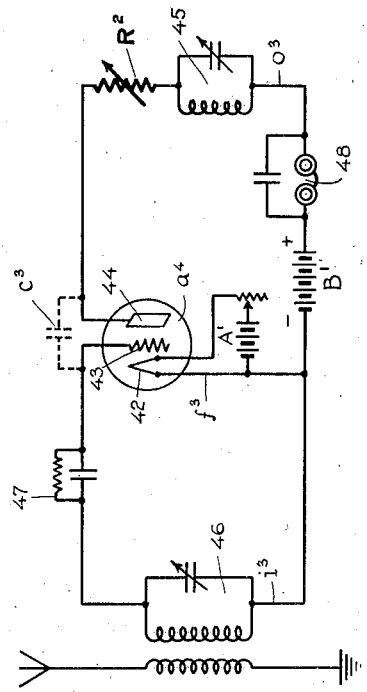

1,713,130

UNITED STATES PATENT OFFICE.

LESTER L. JONES, OF ORADELL, NEW JERSEY.

METHOD OF AND MEANS FOR CONTROLLING ENERGY FEED BACK IN ELECTRON-DISCHARGE DEVICES.

Application filed October 8, 1924. Serial No. 742,342.

This invention relates to electron discharge tube circuits, and relates more particularly to a method of and means for controlling the energy retransfer or feed-back which takes place from the output circuit to the input circuit of the tube due to the capacitive coupling between the grid and plate of the tube; and has special reference to the provision of means for controlling such energy retransfer in radio frequency amplifying tubes to suppress and eliminate oscillations therein.

As is now well known, due to the unshieldable capacity between the plate and grid of an electron discharge tube, a retransfer or feed-back of energy takes place from the output or plate circuit of the tube to the input or grid circuit, which energy or power feed-back is highly objectionable, especially in relay, amplifying or modulating circuits, because it gives rise to distortion of the input voltage power wave form and to incipient or sustained oscillations in the grid circuit, which oscillations interfere with efficient reception, amplification and detection of the received signals. To reduce the feed-back or retransference of energy, a number of methods have heretofore been suggested or devised, one method consisting in impressing an electrostatic charge on the grid which is equal in phase and opposite in sign to the charge carried to the grid from the plate across the capacity therebetween, the impressed charge being caused to vary in correspondence to the varying charge carried to the grid from the plate or output circuit, and thus being effective for neutralizing the charge and preventing the same from building up in the grid circuit and causing the disturbing oscillations therein, this method being disclosed in my copending application to capacitive coupling control system, Serial No. 607,046, filed Dec. 15, 1922. Other methods heretofore suggested comprehend the provision of an inductance means inserted across the grid and plate of the tube, which inductance means together with the capacity effect between the grid and plate produces a circuit that is sharply tuned to the generator frequency, or the provision of a shunt high resistance around the input circuit from the grid to the filament to produce an energy loss in the grid circuit to suppress the oscillations therein due to the energy retransfer to the grid circuit from the plate circuit. My present invention relates to a new type involving a new method of controlling the feed-back of energy from the plate circuit to the grid circuit of the tube, which method possesses many advantages over the known methods, as will become more apparent as the description proceeds.

Considered from a broad aspect, my present invention is predicated upon my discovery that the energy retransfer or feed back from the plate to the grid circuit may be controlled by suitable resistance means inserted in the plate circuit, which resistance means is associated in a predetermined manner with the characteristics and constants of the electron discharge tube. This resistance I have found should preferably, though not necessarily, be inductance and capacity free, and should also preferably be inserted in the plate circuit lumped at the plate, and when said resistance is properly related to the tube characteristics, I have found that it exercises an extremely potent and powerful effect on the retransfer of energy so that the latter may be controlled efficiently and sensitively. From the observed phenomena the presence and arrangement of the inserted resistance in the plate circuit has the effect of absorbing or abstracting energy from the preceding input circuit at substantially the same rate as energy is fed back from the plate to the grid circuit through the grid-plate capacity of the tube; and hence the resistance is effective for neutralizing the feed-back reaction. From this aspect, the selected resistance in the output circuit is effective for producing a transfer or what I term herein a feed-forward of energy from the grid to the plate circuit across the grid-plate capacity, which energy feed-forward is comparable, and which acts in opposition to, the energy retransfer or feed-back, and which is active, therefore, to suppress or neutralize the latter.

Referring to the drawings, wherein I show, for purposes of exemplifying the principles of the invention, two methods of applying the same, Fig. 1 is a wiring diagrammatic view of a radio receiving system of the tuned radio frequency type employing two stages of radio frequency amplification; the invention being shown applied to both of the amplification stages, and Fig. 2 is a wiring diagrammatic view of the tuned grid and wing regenerative circuit showing my invention applied thereto for controlling the energy feed-back therein.

Referring now more in detail to the drawings, and having particular reference first to Fig. 1 thereof, I show a radio receiving system of the tuned radio frequency type having two stages of radio frequency amplification followed by a stage of detection. This system comprises a plurality of electron discharge devices $a$, $a'$ and $a^2$, each including a cathode or filament 10, a grid or screen 11, and an anode or plate 12, the three electrodes being contained in an envelope 13. The electron discharge device $a$ is provided with an input or grid circuit generally designated as $i$ connected to an energy receiving circuit such as the antenna circuit $n$, and is provided with an output or plate circuit generally designated as $o$ which is linked to an input or grid circuit $i'$ associated with the electron discharge device $a'$. The electron discharge device $a'$ is also provided with an output or plate circuit $o'$ which is linked to an input circuit $i^2$ of the detecting electron discharge device or tube $a^2$, the tube $a^2$ being provided with the final output or phone circuit $o^2$.

The first input circuit $i$ may comprise the conventional tuning means such as the variocoupler 14 having its primary 14' in the antenna circuit, and its secondary $14^2$ in the first grid circuit, and a variable condenser 15 in shunt with the variometer secondary $14^2$, one side of the tuning means being connected to the grid 11 by means of the conductor 16, and the other side of the tuning means being connected to the filament 10 by means of the conductors 17, 18 and 19, the filament rheostat 20, and conductor 21. For heating the filament 10 to incandescence to effect the electron discharge emission, there is provided the filament circuit generally designated as $f$ which comprises the battery A, one terminal of which is connected to the filament by means of the conductors 22, 18, and 19, the rheostat 20 and conductor 21, and the other terminal of which is connected to the filament by means of the conductors 23 and 24. The output circuit $o$ includes the battery B, the negative terminal of which may be connected to the positive terminal of the A battery, and the positive terminal of which is connected by means of the conductors 25 and 26 to the primary 27' of the radio frequency transformer 27, the said transformer primary being in turn connected to the plate 12.

As heretofore stated, I have discovered that the insertion of a suitable resistance in the plate circuit properly related to the characteristics and constants of the electron discharge tube produces a very powerful effect on the retransference of energy which takes place from the plate circuit $o$ to the grid circuit $i$ across the grid-plate capacity, which capacity may be diagrammatically represented in dotted outline by the condenser $c$. I have found by empirical determination that this resistance should be preferably located in a position adjacent the plate, the said resistance designated as R in the drawings being connected directly to so as to be lumped at the plate 12 by means of a conductor 28, the said resistance being connected at its other end to the transformer primary 27'. This resistance should be preferably inductance-free, so that all of the available inductance should be conserved for the energy transfer from one tube to a succeeding tube, and should be capacity-free so that the resistance R may be kept as small as possible to minimize the decrease of plate voltage due to the voltage drop in the plate circuit, and so that a balance for all frequencies may be had. From empirical investigations, I have found that the value or magnitude of this resistance determines the control of the energy transfer, and that the maximum value of this resistance should be only equal to the ratio of the output impedance to the amplification constant of the tube. For example, with tubes having an output impedance of ten thousand ohms and an amplification constant of ten, this resistance should have a maximum value of about one thousand ohms. The resistance should be high enough to effect the desired control, but should in practice be maintained at a minimum so as to prevent any appreciable voltage drop across the resistance, and therefore to prevent any appreciable drop or reduction in the plate voltage. With the values of the constants employed in accordance with my invention this voltage drop should not exceed twenty per cent of the value of the plate voltage.

Viewed from the standpoint of the energy relations in the interlinked input and output circuits of the tube, the insertion of the resistance R in the plate circuit has the effect of absorbing or abstracting energy from the grid circuit in proportion to and corresponding with the energy retransfer that takes place from the plate circuit to the grid circuit across the grid-plate capacity. The abstraction or absorption of energy from the input circuit $i$ by the resistance in the plate circuit is 90° out of phase with the energy feed-back or retransfer from the plate circuit to the grid circuit, but takes place in each cycle so that the energy feed-back is effectively compensated for or neutralized. I am aware that it has hitherto been suggested to insert a resistance in the input circuit to produce an energy loss therein to suppress the oscillations due to the energy transferred to the grid circuit from the plate circuit, but this method of producing a loss in the input circuit is not workable practically, and is inefficient because the damping of the input circuit is increased and because there are no corresponding variations in the operation of the system between the energy feed-back and the energy loss. Thus, for example, where resistance is placed in the grid circuit, the added damping of the input circuit is constant and independent of the tube characteristics, whereas when the resistance is put in the plate circuit in accordance with the principles of my invention, the added damping varies with the tube characteristics and tube constants, such as the amplification constant of the tube, the filament intensity and the plate potential as well as the capacity across the grid and plate of the tube, in a way to automatically compensate for any increase or decrease in the energy feed-back due to the variation of these factors. For example, with resistance placed in the grid circuit in accordance with prior practice, if the filament current should be increased, the energy feed-back increases but the local loss in the grid circuit remains constant, so that the same does not compensate for the change in energy retransfer due to the filament current increase and there is therefore no correspondence between the energy feed-back and the local loss in the grid circuit. Where, however, the resistance of my invention is placed in the plate or output circuit, and the filament current is increased with resulting increase in the energy feed-back, the abstraction of energy from the input circuit also increases and in a manner corresponding to the feed-back increase, so that at all times the damping of the input circuit is kept at a predetermined value or the feed-back energy is always equal to the feed-forward loss.

The effect of the resistance of my invention inserted in the plate circuit of abstracting energy from the input circuit or producing an energy feed-forward across the grid-plate capacity, equal and in opposition to the energy feed-back may be further explained on the theory that the feed-forward capacity current through the grid-plate capacity is in effect magnified by the resistance in the plate circuit due to said resistance producing a larger than the normal voltage on the plate which is in phase with the grid voltage, and this current is in series with the inserted plate resistance, and therefore tends to abstract energy from the preceding input circuit. Thus the resistance in producing a larger in phase voltage component has the effect of producing a larger capacity current, and more particularly a larger feed-forward capacity current moving from the grid to the plate; and this feed-forward of energy may be controlled by the size or magnitude of the resistance to nullify any part or the whole of the energy feed-back. While this theory appears to explain the physical phenomena that occur, I desire it to be understood that the theory is given not by way of limitation, but merely by way of plausible explanation. This theory further explains why the feed-forward or abstraction of energy from the grid circuit will always equal the retransfer or feed-back of energy to the grid circuit independent of the change of the tube characteristics, such for example as a change in the amplification constant of the tube, a change in the filament intensity or the plate potential, as well as a change in the value of the grid-plate capacity.

The equalization of the feed-forward of energy with the feedback of energy independent of a change in the tube characteristics or constants is due to the location of the resistance in the electronic current path. Thus with the resistance in the output circuit, an increase in the filament intensity, which as known produces an increase in the feedback of energy from the output to the input circuit due to an increase of the plate potential or the electronic flow of current in the output circuit, produces a corresponding increase in the potential drop across the output resistance and hence a corresponding increase in the plate voltage which is in phase with the grid voltage, resulting in a corresponding increase of abstraction or feed-forward of energy. An increase in the potential of the plate produces the same corresponding changes. An increase in the plate potential, which as known produces an increase in the feed-back of energy from the output to the input circuit, also produces a corresponding increase in the potential drop across the output resistance and hence a corresponding increase in the plate voltage which is in phase with the grid voltage, resulting in an abstraction of energy from the grid circuit corresponding to the feedback of energy from the plate to the grid circuit. It follows that a change in the amplification constant of the tube also produces corresponding changes in the feed-back and feed-forward of energy. If the grid-plate capacity of the tube is increased, this, as known, has the effect of increasing the feed-back of energy and also has the effect of producing a correspondingly larger feed-forward capacity current through the plate resistance, and in such a phase as to cause the increase of feed-forward energy corresponding to the increase of feed-back energy. It is well known that tubes of different manufacture possess different grid-plate capacity values, and with the application of my present invention tubes of different makes or manufacture may be interchanged without affecting the results produced and without necessitating a control or change in the inserted resistance. In this respect my present method is superior to that disclosed in my aforementioned pending application, wherein a charge is impressed on the grid which is equal in magnitude and opposite to the charge carried to the grid from the plate across the capacity therebetween, this latter method necessitating a change in the controlling elements with a change in the tube capacity.

Although I have found it preferable to provide a separate resistance, inductance and capacity-free, and to arrange the same adjacent to so as to be lumped at the plate, it will be apparent that the resistance in the plate circuit may be suitably distributed in other parts of the plate circuit, such for example as the coil of the transformer, provided there is no effective capacitive shunt.

Referring again to Fig. 1 of the drawings, I show the second radio frequency amplification stage also provided with a resistance R' which is shown as variable where a control of the feed-back is desired to be varied. In this second radio frequency stage, the input circuit $i'$ comprises the secondary $27^2$ of the transformer 27 shunted by a variable condenser 29 provided for tuning the input circuit $i'$ to the frequency of the incoming oscillations. In lieu of a capacitively tuned system, I may employ an inductively tuned system following the principles of my invention as described and claimed in my co-pending application to tuned radio frequency amplifying system, Serial No. 716,124, filed May 27, 1924. The input circuit $i'$ is connected to the grid 11 and the filament 10 in a manner similar to that heretofore described for the tube $a$. The filament 10 of the tube $a'$ may be controlled simultaneously with that of the tube $a$ by means of the rheostat 20, the filament of the tube $a'$ being connected in parallel with the filament terminals of the tube $a$ by means of the conductors 30 and 31. The grid-plate capacity of this tube $a'$ may be represented by the condenser $c'$.

The output circuit $o'$ of the tube $a'$ also includes the primary $32'$ of the transformer 32, the secondary $32^2$ of which is connected to the grid and filament of the detecting tube $a^2$, a suitable integrating device or grid leak 33 being provided in the input circuit $i^2$ of the detecting tube. The input circuit $i^2$ may also be tuned to the frequency of the incoming oscillations by means of a variable condenser 34 arranged in shunt with the secondary of the transformer.

The filament 10 of the tube $a^2$ may be controlled by the rheostat 35, the filament and rheostat being connected to the A battery leads by means of conductors 36 and 37. The output circuit $o^2$ may suitably comprise a telephone set 38 shunted by a condenser 39, one terminal of the telephones being connected to the plate 12 by means of the conductor 40, and the other terminal being connected to the plus side of the B battery by means of the conductor 41.

Referring now to Fig. 2 of the drawings, I show another application of my invention to the tuned wing and grid regenerative circuit, which circuit, as is well known, comprises a tuned input circuit $i^3$ connected to the filament 42 and grid 43 of an electron discharge device $a^4$, and an output circuit $o^3$ connected to a battery B' and to the plate 44 of the electron discharge device or tube, the said output circuit comprising tuning means 45 which is controlled to tune the output circuit to the frequency of the input circuit, the latter being controlled by tuning means 46. The regenerative system further includes the integrating device 47 in the input circuit, the phone set 48 in the output circuit, and the filament circuit $f^3$ for heating the filament 42 to incandescence. The best condition for regeneration in this circuit is for the input circuit to be on the verge of oscillation when the tuned wing circuit is in resonance, and the filament of the tube tuned up to normal brilliancy. With large grid-plate capacities, this condition cannot be met because of excessive feed-back across the capacity $c^3$ between the grid and plate of the tube. To permit of obtaining the desired condition, the variable resistance $R^2$ may be inserted in the plate circuit $o^3$ in accordance with the principles of my invention, and when the above described settings are obtained, this resistance $R^2$ may be increased until the input circuit just stops oscillating. With this arrangement, the wing and grid circuits are in resonance and the tube operates at its most efficient point of detection. The variation of feed-back with the filament current variation is small because of the proportionality between the feed-back and the feed-forward of energies, as hereinabove explained.

The mode of operation and functioning of my method of and means for controlling the energy feed-back in detecting or amplifying tubes and the many advantages thereof will in the main be fully apparent from the above detailed description thereof. The control means of my invention functions to abstract energy from the grid circuit to control, balance or compensate the feed-back action which takes place from the output circuit to the input circuit due to the coupling therebetween. This may be further explained by the following analysis.

If we consider a resonant, and preferably sharply turned input circuit as being coupled capacitively (through the grid-plate capacity of the tube) to an inductance and resistance in series, we see that in the absence of any relay action, the coupled resistance serves to damp the oscillations in the input circuit due to energy loss as this coupled circuit is a leak resistance around the tuning condenser. In the absence of the tube relay action, this loss is small, because of the relatively small value of the grid-plate capacity of the tube as compared with the tuning condenser. In such a system, we can not speak of an input and an output circuit because of the absence of a separate source of energy, and we therefore have merely one oscillating circuit. When the tube is lit and the B battery voltage applied through the output resistance and inductance, the signal voltage applied to the grid operates to release a separate source of energy. It is well understood from the art disclosed by Armstrong that the presence of an inductance in the plate circuit operates to transfer energy from the output circuit to the input circuit. Where the feed-back coupling and plate inductance is sufficient to maintain oscillation, this energy retransfer takes place in the absence of any signal. Where the feed-back coupling is insufficient to maintain oscillation, there is no retransfer of energy back into the input circuit until a separate source of energy (the signal) is impressed on the grid circuit. Then the output circuit operates to supply additional energy to the grid circuit. The resistance of my invention operates in similar fashion, except that energy is abstracted from the grid circuit. This transfer of energy from the input to the output circuit occurs due to the signal voltage releasing the oscillatory energy from the B battery in the same manner as for the Armstrong feed-back circuit in the absence of self-sustaining oscillation.

To further show that the resistance in the output circuit of my invention abstracts or withdraws energy from the input circuit, we may first conceive of the fact of feed-back action due to inductance. When the inductance is in the output circuit (Armstrong) the feed-back of energy is shown by the increase in amplitude of the oscillation in the input circuit over what is caused by the signal acting alone, together with an increase in the selectivity or sharpness of tuning of the input circuit. Correspondingly but conversely, I have found that the introduction of substantially capacity and inductance-free resistance in the plate circuit causes a reduction of the amplitude of oscillation in the input circuit below that which is due to the signal acting alone, together with a reduction of the selectivity or sharpness of tuning of the input circuit. The mechanism of operation, comparing the Armstrong feed-back and my feed-forward, is in this respect broadly similar. In Armstrong the amplified plate voltage operates through the grid-plate capacity to feed energy back to the input circuit. In my feed-forward system, the amplified energy in the plate circuit operates to feed energy forward through the grid-plate capacity. There is this difference in the mechanics, however: In the Armstrong feed-back, substantially no change in the effective grid-plate capacity takes place and the current which flows through the grid-plate capacity determining in part the energy feed-back is measured by the grid-plate capacity and the plate voltage. In my feed-forward system, on the other hand, the effective grid-plate capacity is, as heretofore explained, variable with the amplification of the system and the amount of feed-forward resistance in the plate circuit. This is evidenced by the fact that changes in these produce substantial changes in the natural oscillation frequency of the resonant input circuit, the change being always to a lower frequency indicating a higher capacity as the amplification of the system and the feed-forward resistance are increased.

Since I have always found that oscillatory electrical circuits involving relatively constant inductances, capacities and resistances only show changes of selectivity when energy is being supplied or lost relatively uniformly over a number of cycles and at similar points in each cycle, I must regard the tuned input circuit in this system as also receiving or losing energy in accordance with its selectivity changes. The application of electrical forces to the system without the addition or loss of energy can only result in a change of frequency with no change of selectivity or sharpness of tuning. I have found that the circuit of my invention, with constant physical capacities, inductances and resistances, will exhibit very marked changes of selectivity as the filament current of the tube is varied, or as the B battery potential is varied, and that therefore when the selectivity is less than that of the system with the tube extinguished, there must be an abstraction of energy from the tuned input circuit. The function of my feed-forward resistance in the output circuit is simply to produce, through the cooperation of the relay action of the tube and the grid-plate capacity of the tube, an abstraction of energy from the input circuit preferably so as to compensate or neutralize the feed-back of energy from the output circuit to the input circuit, which feedback is also due to the cooperation of the relay action of the tube and its grid-plate capacity, and to the inductive means now used in the art to impress suitably high voltages on the input of a second tube.

While I have shown my invention and the principles thereof in the preferred form and application, it will be apparent that many changes and modifications may be made from the structure disclosed without departing from the spirit of the invention, as defined in the following claims.

I claim:

1. In combination, an electron discharge tube relay having a filament, a grid and a plate, a variably tuned grid circuit, a plate circuit coupled to the grid circuit through the grid-plate capacity of the tube, means comprising an inductance in the plate circuit producing a feed-back of energy through the said grid-plate tube capacity and resistance in said plate circuit having a magnitude of the order of the ratio of the plate circuit impedance of the tube and the amplification constant of the tube for controlling the energy retransfer or feed-back which takes place from the plate circuit to the grid circuit due to the capacity coupling of the circuits.

2. In combination, an electron discharge tube relay having a filament, a grid and a plate, a grid circuit, a plate circuit coupled to the grid circuit through the grid-plate capacity of the tube, means comprising an inductance load in the plate circuit and a capacity free resistance in said plate circuit arranged between the plate and the load and having a magnitude for substantially neutralizing or equalizing the energy feed-back which takes place due to the capacity-coupling of the circuits.

3. In combination, an electron discharge tube relay having a filament, a grid and a plate, a variably tuned grid circuit, a plate circuit coupled to the grid circuit through the grid plate capacity of the tube and having a load for producing an energy feed-back through the grid-plate tube capacity, and resistance in said plate circuit for producing a predetermined energy transfer or feed forward from the input circuit to the output circuit through the medium of said coupling and the relay action of the tube for substantially equalizing or neutralizing the energy retransfer or feed-back which takes place from the output circuit to the input circuit due to the capacity coupling of the circuits.

4. In combination, an electron discharge tube relay having a filament, a grid and a plate, a grid circuit, a plate circuit coupled to the grid circuit through the grid plate capacity of the tube, means comprising an inductance for coupling the plate circuit to a subsequent circuit, and an effective inductance-free resistance quantity in said plate circuit for producing a predetermined energy transfer or feed forward from the input circuit to the output circuit through the medium of said coupling and the relay action of the tube for substantially equalizing or neutralizing the energy retransfer or feed-back, which takes place from the output circuit to the input circuit through the capacity coupling of the circuits due to the useful load of the plate circuit inductance.

5. In combination, an electron discharge tube relay having a filament, a grid and a plate, a grid circuit, a plate circuit coupled to the grid circuit through the grid plate capacity of the tube, an inductance load in said plate circuit, and a resistance means in said plate circuit having a substantially inductance-free effect in the plate circuit for controlling the energy retransfer or feed-back which takes place from the plate circuit to the grid circuit through the capacity coupling of the circuits due to the said inductance load.

6. In combination, an electron discharge tube relay having a filament, a grid and a plate, a variably tuned grid circuit, a plate circuit coupled to the grid circuit through the grid plate capacity of the tube, and resistance means in said plate circuit for controlling the energy retransfer or feed-back which takes place from the plate circuit to the grid circuit due to the capacity coupling of the circuits, said resistance means having a magnitude predetermined to control such retransfer of energy without changing the voltage on the plate more than twenty percent of its value.

7. In combination, an electron discharge device comprising a grid circuit, a plate circuit coupled by the electron discharge device to the grid circuit, an inductance load in said plate circuit, and an effective capacity free resistance in said plate circuit having a magnitude for producing an energy feed-forward across the region of said coupling for controlling the energy feed-back due to the coupling between the circuits.

8. In combination, an electron discharge device comprising a grid circuit, a plate circuit coupled by the electron discharge device to the grid circuit, an inductance coupling said plate circuit to a subsequent circuit and an effective capacity and inductance free resistance in the plate circuit for producing an energy feed-forward across the region of said coupling for controlling the energy feed-back due to the coupling between the circuits.

9. In a cascade amplifying system, a plurality of electron discharge devices, a transformer inductively coupling said devices and having a primary in the output circuit of one of said devices, and an effective inductance-free resistance in said output circuit arranged between the plate of the tube and the primary of the transformer, the said resistance having a magnitude equal substantially to the ratio of the output impedance and the amplification constant of the tube.

10. In a cascade amplifying system, a plurality of electron discharge devices, one of said devices having a resonant input circuit, a transformer inductively coupling said devices and having a primary in the output circuit of said one of said devices, and an effective inductance-free resistance in said output circuit in series with the primary of the transformer, said resistance having a predetermined magnitude for substantially neutralizing the feed-back in said device.

Signed at New York city, in the county of New York and State of New York, this 7th day of October, A. D. 1924.

LESTER L. JONES.